(12) United States Patent
Kaneko et al.

(10) Patent No.: US 8,072,569 B2
(45) Date of Patent: Dec. 6, 2011

(54) FRINGE FIELD SWITCHING LIQUID CRYSTAL DISPLAY PANEL

(75) Inventors: Hideki Kaneko, Azumino (JP); Masahiro Horiguchi, Azumino (JP)

(73) Assignee: Sony Corporation, Tokyo (JP)

( * ) Notice: Subject to any disclaimer, the term of this patent is extended or adjusted under 35 U.S.C. 154(b) by 770 days.

(21) Appl. No.: 11/898,549

(22) Filed: Sep. 13, 2007

(65) Prior Publication Data
US 2008/0068539 A1 Mar. 20, 2008

(30) Foreign Application Priority Data

Sep. 15, 2006 (JP) ................................. 2006-250391
Jul. 3, 2007 (JP) ................................. 2007-174855

(51) Int. Cl.
*G02F 1/1335* (2006.01)
*G02F 1/1343* (2006.01)

(52) U.S. Cl. ........ 349/141; 349/106; 349/142; 349/143; 349/144

(58) Field of Classification Search .................. 349/106, 349/141–144
See application file for complete search history.

(56) References Cited

U.S. PATENT DOCUMENTS

| | | | | |
|---|---|---|---|---|
| 6,721,028 B2 * | 4/2004 | Kim et al. | ..................... | 349/141 |
| 7,440,063 B2 * | 10/2008 | Choi et al. | ..................... | 349/141 |
| 2002/0163604 A1 * | 11/2002 | Kim et al. | ..................... | 349/43 |
| 2006/0146243 A1 * | 7/2006 | Nakanishi et al. | ........... | 349/139 |
| 2006/0256268 A1 * | 11/2006 | Jeong et al. | ................... | 349/141 |
| 2007/0002247 A1 * | 1/2007 | Lee | ................................ | 349/141 |
| 2007/0002252 A1 * | 1/2007 | Kaneko et al. | ................ | 349/141 |

FOREIGN PATENT DOCUMENTS

| | | |
|---|---|---|
| JP | 10-319371 A | 12/1998 |
| JP | 2002-14363 A | 1/2002 |
| JP | 2002-131767 A | 5/2002 |
| JP | 2002-244158 A | 8/2002 |
| JP | 2003-195352 A | 7/2003 |
| JP | 2005-309052 A | 11/2005 |

* cited by examiner

*Primary Examiner* — Huyen Ngo
(74) *Attorney, Agent, or Firm* — K&L Gates LLP

(57) ABSTRACT

A Fringe Field Switching ("FFS") mode liquid crystal display panel 10A includes an array substrate having first electrodes 14 each provided in a space delimited by a plurality of scan lines 12 and signal lines 17, second electrodes 21 provided on the first electrodes 14 with an insulator therebetween, and a plurality of slits 20A provided to each of the second electrodes 21 in parallel with one another in a direction crossing the signal lines 17; and a color filter substrate having a color filter layer. Each of the slits 20A has an open end 20A' on one side. The color filter layer has a centerline 30 extending along the signal lines 17 for individual pixels, and the centerline 30 coincides with a display centerline 32 that is shifted toward the open end side of the slits from a centerline 31 of each second electrode as viewed from above. Accordingly, an FFS mode liquid crystal display panel is obtained that causes no color mixtures with this arrangement in which the slits each having an open end on one side are formed in each second electrode.

18 Claims, 15 Drawing Sheets

FIG.3
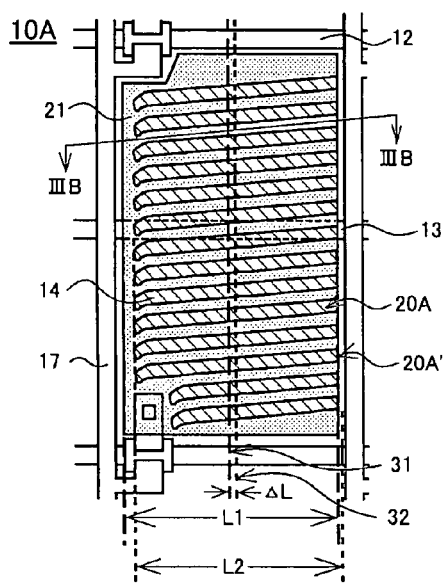
FIG.3A
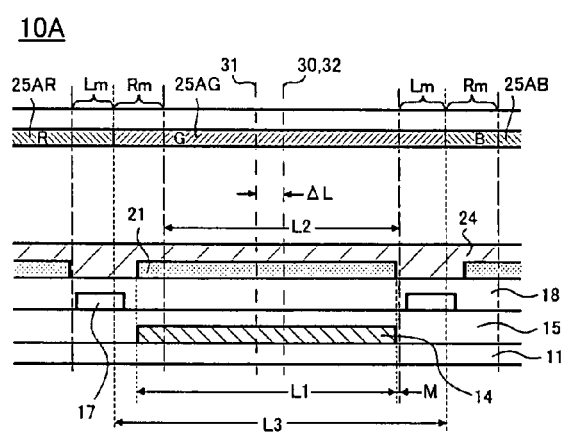
FIG.3B (prior art)

(prior art)

FIG.13
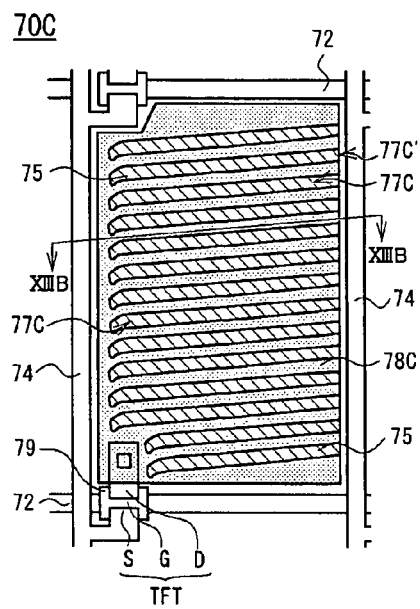
FIG.13A
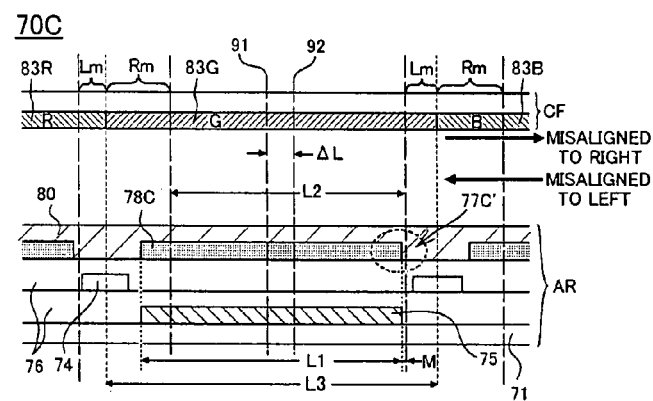
FIG.13B
(prior art)

(prior art)

FRINGE FIELD SWITCHING LIQUID CRYSTAL DISPLAY PANEL

BACKGROUND

1. Technical Field

The present invention relates to a liquid crystal display panel of a fringe field switching (FFS) mode that includes a pair of substrates holding a liquid crystal layer, a common electrode provided to one of the substrates, and a pixel electrode provided corresponding to the common electrode with an insulator therebetween, and drives the liquid crystal layer by an electric field formed between the common electrode and pixel electrode. More particularly, the invention relates to a liquid crystal display panel that has slits whose ends are open on one side in each pixel electrode and provides bright displays without color mixture with improved alignment of a pixel electrode and a color filter.

2. Related Art

Over recent years, liquid crystal display panels have been much employed not only in information and telecommunications equipment but in electrical equipment in general. The liquid crystal display panels that have long been in use are made up of a pair of substrates of glass or the like with electrodes and so on formed on their surfaces, and a liquid crystal layer formed between such pair of substrates. Images of various types are displayed by the application of voltage to the electrodes on the two substrates, which rearranges the liquid crystals, altering the transmittance of light therethrough. This is what may be called the "longitudinal field mode". Among such longitudinal field mode liquid crystal display panels there exist those with a twisted nematic (TM) mode or vertical alignment (VA) mode, which however have the problem that their viewing angle is narrow. Accordingly, longitudinal field mode liquid crystal display panels with various improvements such as a multidomain vertical alignment (MVA) mode have been developed.

On the other hand, liquid crystal display panels that may be called "transverse field mode" are also known as in-plane switching (IPS) mode liquid crystal display panels that differ from the longitudinal field mode described above in having electrodes on one substrate only (see JP-A-10-319371 and JP-A-2002-131767). The operating principles of such an IPS mode liquid crystal display panel will now be described using FIGS. 8 and 9. FIG. 8 is a schematic plan view of a single pixel portion of the IPS mode liquid crystal display panel. FIG. 9 is a cross-sectional view along line IX-IX in FIG. 8.

This IPS mode liquid crystal display panel 50 has an array substrate AR and a color filter substrate CF. The array substrate AR has a plurality of scan lines 52 and common wires 53 provided in parallel with one another on a surface of a first transparent substrate 51, and a plurality of signal lines 54 provided in the direction orthogonal to these scan lines 52 and common wires 53. In the central portion of each pixel there is provided a common electrode 55 having for example a comb-like shape as in FIG. 8 and extending strip-like from the common wire 53. A pixel electrode 56, likewise of a comb-like shape, is provided so as to enclose the spaces around the peripheries of the common electrode 55, and the surface of the pixel electrode 56 is covered with a protective insulator 57 of silicon nitride and an alignment layer 58 of polyimide, for example.

Close to the intersections of the scan lines 52 and signal lines 54 there are formed thin film transistors (TFTs) that serve as switching elements. For each TFT, a semiconductor layer 59 is laid between a scan line 52 and signal line 54; a signal line portion on the semiconductor layer 59 constitutes the TFT's source electrode S and a scan line portion below the semiconductor layer 59 constitutes the TFT's gate electrode G, while a part of the pixel electrode 56 that overlaps part of the semiconductor layer 59 constitutes the TFT's drain electrode D.

The color filter substrate CF has a configuration such that a color filter layer 61 of red, green, or blue, an overcoat layer 62, and an alignment layer 63 are provided on a surface of a second transparent substrate 60. To form the IPS mode liquid crystal display panel 50, the array substrate AR and color filter substrate CF are positioned opposing each other so that the pixel electrode 56 and common electrode 55 on the array substrate AR and the color filter layer 61 on the color filter substrate CF face each other, a liquid crystal LC is sealed therebetween, and polarizing plates 64 and 65 are deposed on the outer side of the substrates AR and CF, respectively, so that their polarization directions are orthogonal to each other.

In this IPS mode liquid crystal display panel 50, when an electric field is formed between the pixel electrode 56 and common electrode 55, the liquid crystals, which are aligned horizontally, will gyrate horizontally as shown in FIG. 9. By means of this it is possible to control the amount of incident light from the backlight that is transmitted. This IPS mode liquid crystal display panel 50 has the advantages of a wide viewing angle and high contrast, but also has the problems of low aperture ratio and transmittance because the common electrode 55 is formed from the same metallic material as the common wires 53 or scan lines 52, as well as the problem of color variation depending on the viewing angle.

FFS mode liquid crystal display panels that may be called "oblique field mode" (see JP-A-2002-14363, JP-A-2002-244158, JP-A-2003-195352, and JP-A-2005-309052) have been developed in order to resolve the problems of low aperture ratio and transmittance in IPS mode liquid crystal display panels. The operating principles of such an FFS mode liquid crystal display panel will now be described using FIGS. 10 and 11. FIG. 10 is a schematic plan view of a single pixel portion of an FFS mode liquid crystal display panel. FIG. 11 is a cross-sectional view along line XI-XI in FIG. 10.

This FFS mode liquid crystal display panel 70A has an array substrate AR and a color filter substrate CF. The array substrate AR has a plurality of scan lines 72 and common wires 73 provided in parallel with one another on a surface of a first transparent substrate 71, and a plurality of signal lines 74 provided in the direction orthogonal to these scan lines 72 and common wires 73. A common electrode 75 coupled to the common wires 73 and formed from indium tin oxide (ITO) or a like transparent material is provided so as to cover each space delimited by the scan lines 72 and signal lines 74. Over a surface of the common electrode 75 there are provided therebetween, with an insulator 76 interposed, a pixel electrode 78A constituted of ITO or a like transparent material in which a plurality of stripe-like slits 77A are formed. The surfaces of the pixel electrode 78A and the slits 77A therein are covered by an alignment layer 80.

Close to the positions where the scan lines 72 and signal lines 74 intersect there are formed TFTs that serve as switching elements. For each TFT, a semiconductor layer 79 is laid on a surface of the scan line 72, and a portion is extended from the signal line 74 so as to cover part of the surface of the semiconductor layer 79 and constitute the TFT's source electrode S; a scan line portion below the semiconductor layer 79 constitutes the TFT's gate electrode G, while a part of the pixel electrode 78A that overlaps part of the semiconductor layer 79 constitutes the TFT's drain electrode D.

The color filter substrate CF has a configuration such that a color filter layer 83 of red, green, or blue, an overcoat layer 84, and an alignment layer 85 are provided on a surface of a second transparent substrate 82. To form the FFS mode liquid crystal display panel 70A, the array substrate AR and color filter substrate CF are positioned opposing each other so that the pixel electrode 78A and common electrode 75 on the array substrate AR and the color filter layer 83 on the color filter substrate CF face each other, liquid crystal LC is sealed therebetween, and polarizing plates 86 and 87 are deposed on the outer side of the substrates AR and CF, respectively, in such a manner that their polarization directions are orthogonal to each other.

In this FFS mode liquid crystal display panel 70A, when an electric field is formed between the pixel electrode 78A and common electrode 75, the field is oriented toward the common electrode 75 at both sides of the pixel electrode 78A, as shown in FIG. 11. Consequently, not only does the liquid crystal present at the slits 77A move, but so does the liquid crystal present over the pixel electrode 78A. As a result, the FFS mode liquid crystal display panel 70A has the features of having an even wider viewing angle and higher contrast than the IPS mode liquid crystal display panel 50, and moreover an ability to provide bright displays thanks to possessing high transmittance. In addition, the FFS mode liquid crystal display panel 70A has a greater overlap area, viewed from above, between the pixel electrode 78A and common electrode 75 than the IPS mode liquid crystal display panel 50 has, and, as a collateral effect thereof, a larger holding capacity and hence the advantage that no auxiliary capacity line needs to be specially provided.

In an FFS mode liquid crystal display panel, similarly to the IPS mode liquid crystal display panel disclosed in JP-A-10-319371, it is preferable for the sake of the display characteristics that the rubbing direction should be orthogonal to the signal lines, and the pixel electrodes be provided at a slight inclined angle relative to the rubbing direction. Accordingly, a structure may be adopted whereby stripe-like slits 77B provided in a pixel electrode 78B are inclined relative to the scan lines 72 as in the FFS mode liquid crystal display panel 70B shown in FIG. 12. Similarly, in order to widen an aperture and provide brighter displays, an open end 77C' is provided to one end of each slit 77C provided in a pixel electrode 78C, as in an FFS mode liquid crystal display panel 70C shown in FIGS. 13A and 13B. FIG. 13B is a cross-sectional view with the color filter substrate included along line XIIIB-XIIIB in FIG. 13A.

In order to eliminate color variation depending on the viewing angle, stripe-like slits 77D provided in a pixel electrode 78D may be arranged in two mutually inclined sets, one above the other, thus producing dual domains, as in an FFS mode liquid crystal display panel 70D shown in FIG. 14. Furthermore, the signal lines 74 may be provided in a crank-shape in a direction orthogonal to the scan lines 72, and a plurality of common electrodes 75E and pixel electrodes 78E be arranged in a delta layout, so that the signal lines 74 will not form straight lines, and the device will be well suited for image displays, as in an FFS mode liquid crystal display panel 70E shown in FIG. 15.

The FFS mode liquid crystal display panels 70B to 70D shown in FIGS. 12 to 14 differ from the FFS mode liquid crystal display panel 70A shown in FIG. 10 only in that the slits 77B to 77D provided in their pixel electrodes 78B to 78D are inclined and have different shapes. Moreover, the FFS mode liquid crystal display panel 70E shown in FIG. 15 differs from the FFS mode liquid crystal display panel 70A shown in FIG. 10 only in that slits 77E provided in its pixel electrodes 78E are inclined and that its a plurality of common electrodes 75E and pixel electrodes 78E are arranged in a delta layout. In the below, component elements that have identical structure to those in the FFS mode liquid crystal display panel 70A shown in FIG. 10 are assigned the identical reference numerals and detailed descriptions thereof are omitted.

While the common wires are provided in parallel with the scan lines for individual pixels in the FFS mode liquid crystal display panels 70B to 70E shown in FIGS. 12 to 15, the common wires can be provided anywhere between adjacent scan lines, and therefore they are not specifically shown. While the slits in pixel electrodes are provided in parallel with one another in a transverse direction of the scan lines in the FFS mode liquid crystal display panels 70A to 70E shown in FIGS. 10 to 15, they may be provided in parallel with one another in a longitudinal direction of the scan lines (not shown).

Thus, FFS mode liquid crystal display panels have the features of having an even wider viewing angle and higher contrast than IPS mode liquid crystal display panels, and moreover of being able to provide bright displays thanks to possessing high transmittance. Furthermore they can be driven with low voltage, and what is more, have a larger holding capacity generated as collateral effect, which means that they yield good display quality without special provision of auxiliary capacity lines.

There is formed in such an FFS mode liquid crystal display panel a transverse electric field primarily in a direction substantially orthogonal to the longer sides of the slits. When the panel is driven to transmit light, the slits in the pixel electrodes and pixel electrode portions laid in parallel with the slits transmit light in lines in such a manner that both the slits and pixel electrode portions appear to emit light in lines. On the shorter sides of the slits where their ends in the longitudinal direction are closed, a transverse electric field primarily in a direction substantially orthogonal to the shorter sides is formed. Consequently, the two-direction transverse electric fields cause a reverse twist in part of the liquid crystal molecules, whereby transmitted light cannot be accurately controlled and thus brightness is lowered.

In the FFS mode liquid crystal display panel 70C shown in FIG. 13, each slit 77C provided in the pixel electrode 78C has the open end 77C' on one side, thereby making the liquid crystal element twist with an electric field normally formed in a portion before the open end 77C' of each slit, which has a fringe effect. Consequently, a display opening area in this display panel is wider by a width M than an FFS mode liquid crystal display panel having slits whose both ends in the longitudinal direction are closed. As a result, an FFS mode liquid crystal display panel is obtained that provides brighter displays.

This arrangement of the slits in pixel electrodes extending in a direction crossing the signal lines, however, sometimes causes color mixture in the FFS mode liquid crystal display panel 70C having the slits whose ends are open on one side. Upon conducting a series of various investigations into the causes of the occurrence of the color mixture in such an FFS mode liquid crystal display panel having slits whose ends are open on one side, the present inventors found that it was due to causes described below.

As shown in FIG. 13B, which is a sectional view also showing the color filter substrate along line XIIIB-XIIIB in FIG. 13A, a centerline 91 along the signal line 74 of the pixel electrode 78C in each pixel is physically located at the center in the width direction of the pixel electrode 78C. In contrast, the display width L2 extends from one (closed) end of each slit 77C in the pixel electrode 78C to another (open) end 77C' plus the width M as shown in FIG. 13B. Therefore, a display centerline 92 of the display region along the signal line 74 is located nearer to the open end 77C' of each slit 77C. Since the right and left ends of the color filter coincident with centers of the signal lines 74 in the related-art arrangement, as viewed from above, Rm is larger than Lm (Rm>Lm) where Rm is a distance from the left end of the filter to a median position between adjacent display regions and Lm is a distance from the right end of the filter to that median position.

A distance ΔL from the centerline 91 of the pixel electrode 78C and the display centerline 92 is determined by the formula below:

$$\Delta L = (L1 - L2)/2$$

where L1 is the width of the pixel electrode 78C. The distance ΔL varies depending on manufacturing devices and other factors, and generally ranges from about 1 to 5 μm.

This causes a problem when the array substrate AR and color filter substrate CF are combined. The display region is located nearer to the edge of the pixel electrode 78C on the open end 77C' side of each slit 77C, giving a low tolerance Lm for misalignment. In contrast, the display region is located away from the edge of the pixel electrode 78C on the closed end side of each slit 77C, giving a high tolerance Rm for misalignment. Consequently, supposing that the open end 77C' of each slit 77C is on the right, moderate misalignment of the color filter substrate CF to the right will cause no change in displayed colors, but a bit of misalignment of the substrate CF to the left will result in color mixture because the substrate overlaps an adjacent display region. While a black matrix can be interposed between adjacent color filters in the color filter substrate CF to prevent color mixture, if an attempt is made to form the black matrix to prevent color mixture in consideration of the potential for misalignment of the substrate, the black matrix, which does not transmit any light, becomes so thick that transmittance will be compromised.

SUMMARY

An advantage of some aspects of the invention is to provide an FFS mode liquid crystal display panel that has slits whose ends are open on one side in each pixel electrode and provides bright displays without color mixture with improved alignment of a pixel electrode and a color filter.

A liquid crystal display panel according to a first aspect of the present invention includes: an array substrate, the array substrate including a plurality of scan lines provided in parallel with one another, a plurality of signal lines provided in a direction orthogonal to the scan lines, first electrodes each provided in a space delimited by the scan lines and the signal lines, second electrodes provided corresponding to the first electrodes with an insulator therebetween, and portions defining a plurality of slits provided to each of the second electrodes in parallel with one another in a direction crossing the signal lines; a color filter substrate including a color filter layer; and a liquid crystal layer held between the array substrate and the color filter substrate. The liquid crystal display panel drives the liquid crystal layer by an electric field formed between the first electrodes and the second electrodes. Each of the slits has an open end on one side. The color filter layer has a centerline extending along the signal lines for individual pixels, and the centerline is shifted toward the open end side of each slit from a centerline of each second electrode as viewed from above.

A liquid crystal display panel according to a second aspect of the present invention includes: an array substrate, the array substrate including a plurality of scan lines provided in parallel with one another, a plurality of signal lines provided in a direction orthogonal to the scan lines, first electrodes each provided in a space delimited by the scan lines and the signal lines, second electrodes provided corresponding to the first electrodes with an insulator therebetween, and portions defining a plurality of slits provided to each of the second electrodes in parallel with one another in a direction crossing the signal lines; a color filter substrate including a color filter layer; and a liquid crystal layer held between the array substrate and the color filter substrate. The liquid crystal display panel drives the liquid crystal layer by an electric field formed between the first electrodes and the second electrodes. Each of the slits has an open end on one side. The color filter layer has a centerline shifted toward the open end side of each slit from a centerline located in a median position between centers of adjacent signal lines as viewed from above. The centerline herein refers to a centerline along the signal lines for individual pixels.

In either of the aspects, the centerline of the color filter layer may coincide with a display centerline that is shifted toward the open end side of each slit.

In either of the aspects, the slits may be provided so as to be inclined relative to the scan lines.

In either of the aspects, the liquid display panel may also include a common wire provided between the scan lines in parallel with the scan lines, and the slits may be provided so as to be inclined in different directions to each other on both sides of the common wire.

In either of the aspects, the numbers of the slits provided on each of both sides of the common wire may be equal.

In either of the aspects, the ends of the slits on both sides of the common wire that are closest thereto may be joined above the common wire.

In either of the aspects, the slits lying in pixels on odd-numbered lines and even-numbered lines may be inclined in opposite directions to each other.

In either of the aspects, the signal lines may be provided in a crank shape in a direction orthogonal to the scan lines, and the first electrodes and the second electrodes may be arranged in a delta layout.

In either of the aspects, ends of adjacent color filter layers may overlap in a direction in which the scan lines extend, and the color filter may center on a centerline of an area of the color filter layer with any overlap area excluded.

Thanks to having a structure such as described above, the invention yields the excellent advantages that will now be described. In the liquid crystal display panel according to the above-described aspects or features of the invention, each of the slits provided to the second electrodes in parallel with one another in a direction crossing the signal lines has an opening end on one side. Furthermore, the centerline of the color filter layer along the signal lines for individual pixels is either shifted toward the open end side of each slit from the centerline of each second electrode as viewed from above, shifted toward the open end side of each slit from a centerline located in a median position between centers of adjacent signal lines as viewed from above, or aligned to coincide with a display centerline that is shifted toward the open end side of each slit. Therefore, although the color filter appears to be misaligned, tolerances for misalignment to the right and left come to be equal or become substantially equal. Accordingly, even if there is moderate misalignment of the array substrate and color filter substrate to the right or left when combined, the color filter layer can cover the entire display width of individual pixels as viewed from above. Consequently, light that the pixels transmit passes through right color filter layers.

Since each slit provided in the second electrode has an open end on one side, it is possible to exert a fringe effect thoroughly in a portion before the open end side of each slit. Accordingly, the area serving as a display region in a single pixel is wider by the width M shown in FIG. 3 than in a liquid crystal display panel having slits whose both ends are closed. As a result, an FFS mode liquid crystal display panel is obtained that provides bright displays with less color mixture.

When the slits are provided so as to be inclined relative to the scan lines, which means that a minute-angle inclination can be formed between the second electrode and the rubbing direction of an alignment layer, a liquid crystal display panel is obtained that has good contrast and other display characteristics while also yielding the advantages of the invention.

When the common wire is provided between the scan lines in parallel with the scan lines, and furthermore the slits in an FFS mode liquid crystal display panel are provided so as to be inclined in different directions to each other on both sides of the common wire, thus producing dual domains, the potential for color variation depending on the viewing angle can be thoroughly reduced, and thus an FFS mode liquid crystal display panel is obtained that has good display characteristics while also yielding the advantages of the invention. While the common wire is usually fabricated from the same conductive material as the scan lines and therefore be opaque, the opaque scan lines block light at disclination portions that occur between the dual domains. As a result, a liquid crystal display panel is obtained that has even better display characteristics.

When the numbers of the slits provided on each of both sides of the common wire are equal, the potential for color variation depending on the viewing angle from both sides of the common wire can be thoroughly reduced, and thus a liquid crystal display panel is obtained that has good display characteristics.

When the ends of the slits on both sides of the common wire that are closest thereto are joined above the common wire, it is possible to reduce the size of disclination portions that occur at the positions where the slit sets inclined in different directions to each other on both sides of the common wire are adjacent. As a result, a liquid crystal display panel is obtained that has good display characteristics.

When the slits lying in pixels on odd-numbered lines and even-numbered lines are inclined in opposite directions to each other, there is less dependence on the viewing angle when viewed in a direction crossing the signal lines. As a result, a liquid crystal display panel is obtained that has good display characteristics while also yielding the advantages of the invention.

When the signal lines are provided in a crank shape in a direction orthogonal to the scan lines, and the first and second electrodes are arranged in a delta layout (also known as a triangle layout), a liquid crystal display panel is obtained that is well suited for image displays while also yielding the advantages of the invention.

When ends of adjacent color filter layers overlap in a direction in which the scan lines extend and the color filter centers on a centerline of an area of the color filter layer with any overlap area excluded, it is possible to prevent light from leaking through a gap between adjacent color filter layers due to misalignment of the layers, while also yielding the advantages of the invention.

BRIEF DESCRIPTION OF THE DRAWINGS

The invention is described with reference to the accompanying drawings, wherein like numbers reference like elements.

FIG. 3A is a schematic plan view showing the width and centerline of the electrode in FIG. 1 and a display width and centerline, and FIG. 3B is a cross-sectional view with the color filter substrate included along line IIIB-IIIB in FIG. 3A.

FIG. 13A is a schematic plan view of another related-art FFS mode liquid crystal display panel, and FIG. 13B is a cross-sectional view with the color filter substrate included along line XIIIB-XIIIB in FIG. 13A.

DESCRIPTION OF EXEMPLARY EMBODIMENTS

Exemplary embodiments of the invention will now be described with reference to the accompanying drawings. It should be understood that the embodiments described below are by way of examples of liquid crystal display panels realizing the technical thought of the invention and are not to be construed as limiting the invention to these particular liquid crystal display panels. The invention can equally well be adapted to other embodiments contained within the scope of the claims appended hereto.

First Embodiment

Figure 1:
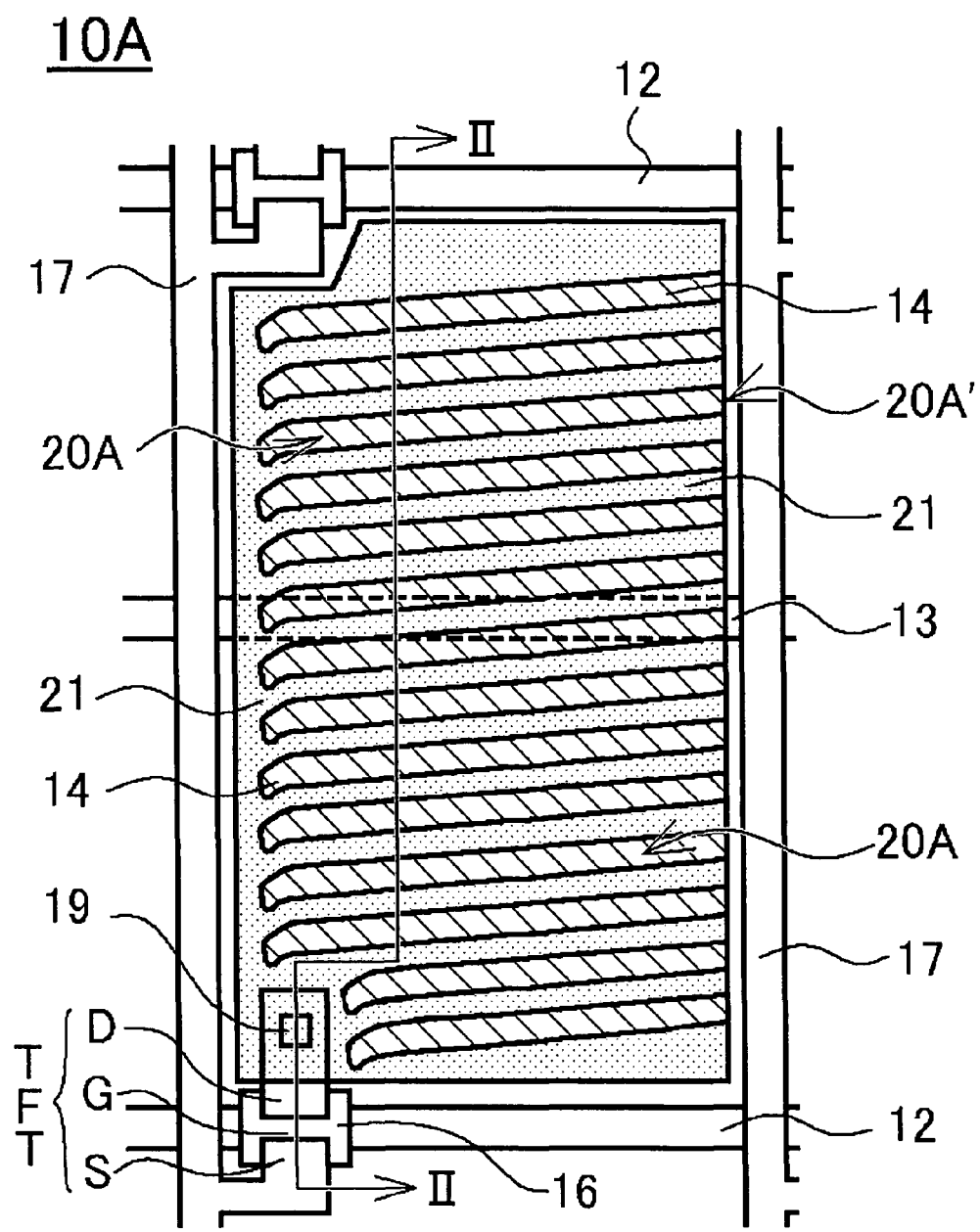
FIG. 1 is a schematic plan view of a single pixel portion of an FFS mode liquid crystal display panel of a first embodiment of the invention, seen through its color filter substrate and alignment layer.
Figure 2:
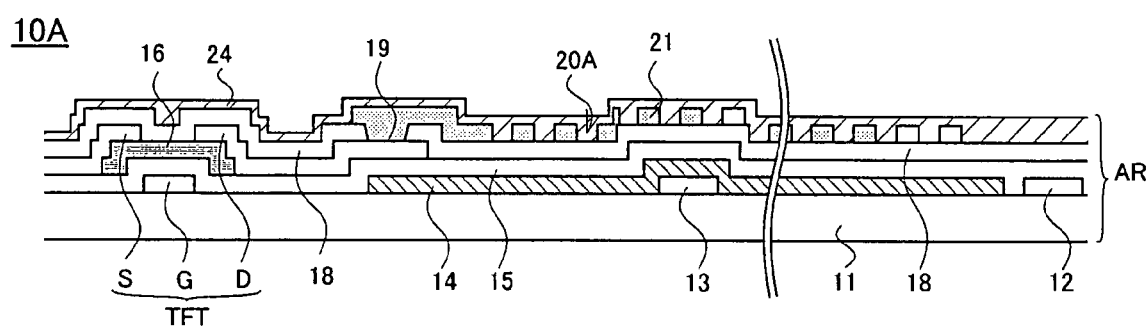
FIG. 2 is a cross-sectional view along line II-II in FIG. 1.

A liquid crystal display panel according to a first embodiment of the invention is what can be called an "FFS mode", and includes: an array substrate having a common electrode, an insulator provided on the common electrode, and a pixel electrode provided on the insulator; a color filter substrate having a color filter layer; and a liquid crystal layer held between the array substrate and color filter substrate. The liquid crystal display panel drives the liquid crystal layer by an electric field formed between the common electrode and pixel electrode. This FFS mode liquid crystal display panel 10A of the first embodiment is described below by recounting the process of the manufacture thereof, using FIGS. 1 to 3. FIG. 1 is a schematic plan view of a single pixel portion of an FFS mode liquid crystal display panel of a first embodiment of the invention, seen through its color filter substrate and alignment layer. FIG. 2 is a cross-sectional view along line II-II in FIG. 1. FIG. 3A is a schematic plan view showing the width and centerline of the electrode in FIG. 1 and a display width and centerline, and FIG. 3B is a cross-sectional view with the color filter substrate included along line IIIB-IIIB in FIG. 3A.

The FFS mode liquid crystal display panel 10A of the first embodiment is a counterpart of a related-art FFS mode liquid crystal display panel 70C shown in FIGS. 13A and 13B. According to the first embodiment, the array substrate AR of the FFS mode liquid crystal display panel 10A includes a transparent substrate 11 constituted by a substrate of glass or the like, over the entire surface of which a two-layer film composed of a lower layer of aluminum (Al) metal and a surface layer of molybdenum (Mo) metal is formed, from which film there are then formed, by photolithographic and etching methods, a plurality of scan lines 12 and a plurality of common wires 13, lying parallel to each other and including Mo—Al two-layer wiring lines. Aluminum has the merit that its resistance is low, but on the other hand has the shortcomings of being prone to corrosion and having high contact resistance with ITO. Accordingly, a structure whereby the aluminum is covered over with molybdenum is adopted so as to ameliorate such shortcomings. While each common wire 13 is located at a median position between adjacent scan lines 12 in this example, the common wires 13 can be provided anywhere between adjacent scan lines 12.

Next, the entire surface of the transparent substrate 11 with the scan lines 12 and common wires 13 formed thereon is covered with a transparent conductive layer constituted of ITO, for example, from which common electrodes 14 (first electrodes) are then formed, again using photolithographic and etching methods. The common electrodes 14 are electrically connected to the common wires 13, but are not connected to the scan lines 12 or gate electrodes G. The entire surface is further covered with a gate insulator 15 constituted of a silicon nitride or silicon oxide layer. Then, the entire surface of the gate insulator 15 is covered with a layer of, say, amorphous silicon ("a-Si" below) via the CVD method, after which a semiconductor layer 16 constituted of an a-Si layer is formed in the TFT formation areas, once again using photolithographic and etching methods. The regions of the scan lines 12 at the positions where the semiconductor layer 16 is formed form the TFT gate electrodes G.

Next, the entire surface of the transparent substrate 11 with the semiconductor layer 16 formed thereon is covered with an Mo—Al—Mo three-stratum conductive layer, from which signal lines 17 and drain electrodes D are then formed, once again using photolithographic and etching methods. The source electrode S portions of the signal lines 17 and the drain electrode D portions both overlap partially with the surface of the semiconductor layer 16. Further, the entire surface of the substrate is then covered with an insulator 18 constituted of a silicon nitride layer.

Next, contact holes 19 are formed in the positions in the insulator 18 that correspond to the drain electrodes D, so as to partially expose the drain electrodes D. Subsequently, the entire surface is covered with a transparent conductive layer constituted of ITO, for example, from which pixel electrodes 21 (second electrodes) are then formed on the insulator 18 in spaces delimited by the scan lines 12 and the signal lines 17 to have the pattern shown in FIG. 1, again using photolithographic and etching methods. Each of the pixel electrode 21 has slits 20A therein. The pixel electrode 21 has strip-like portions located between the slits 20A provided in parallel with one another and a linking portion that links the strip-like portions to form a comb-like shape on one end of the strip-like portions. On the other end of the strip-like portions, they are not connected. In other words, each slit 20A has a closed end on one side, and an open end 20A' on the other. As shown in FIG. 1, the slits 20A are inclined relative to the scan lines 12 at about 5° to 20°. The pixel electrode 21 is electrically connected to the drain electrode D via the contact hole 19.

As a further step, a predetermined alignment layer 24 is formed over the entire surface, whereupon the array substrate AR is complete. Subsequently, to obtain the FFS mode liquid crystal display panel 10A of the first embodiment, the array substrate AR fabricated in the foregoing manner is positioned facing a separately fabricated color filter substrate, the peripheries of the two substrates are sealed with a sealing material, and liquid crystal is poured into the space therebetween. The color filter substrate used here is substantially the same as in related-art arrangements, except that, as will be described below with reference to FIG. 3, a centerline 30 of color filter layers 25AR, 25AG, 25AB corresponding to each pixel coincides with a display centerline 32 that is shifted toward an open end 20A' side of each slit from a centerline 31 of the pixel electrode 21 as viewed from above, and detailed descriptions thereof are omitted.

Referring to FIGS. 3A and 3B, in the FFS mode liquid crystal display panel 10A of the first embodiment, the centerline 31 of the pixel electrode 21 along a direction in which the signal lines 17 extend is physically located at the center in the width direction of the pixel electrode 21. In contrast, a display width L2 throughout which transmitted light can be accurately controlled extends substantially from one (closed) end of each slit 20A in the pixel electrode 21 to another (open) end 20A'. Therefore, the display centerline 32 of the display region along the signal lines 17 is located at the center of the display width L2 and is nearer to the open end 20A' of each slit 20A. A distance ΔL from the centerline 31 of the pixel electrode and the display centerline 32 is determined by the formula below:

$$\Delta L = (L1 - L2)/2$$

where L1 is the width of the pixel electrode 21. As already described by referring to FIG. 13B, the distance ΔL varies depending on manufacturing devices and other factors, and generally ranges from about 1 to 5 μm.

In the FFS mode liquid crystal display panel 10A of the first embodiment, the centerline 30 of the color filter layers 25AR, 25AG, 25AB in a direction in which the signal lines 17 extend corresponding to each pixel coincides with the display centerline 32 as viewed from above. Although the thus-arranged color filter layers appear to be misaligned toward the open end 20A' side of each slit 20A, tolerances for misalignment of the color filter layers to the right and left become substantially equal, because Rm and Lm are equal where Rm is a distance from the left end of the filter to a median position between adjacent display regions and Lm is a distance from the right end of the filter to that median position. Accordingly, even if there is moderate misalignment of the color filter substrate and array substrate to the right or left when combined, the entire display width L2, as viewed from above, of individual pixels can be substantially covered. Consequently, light that the pixels transmit passes through right color filter layers 25AR, 25AG, 25AB, thereby causing less color mixture due to light leaked from adjacent pixels.

Since it is less likely that color mixture occurs, the thickness of a black matrix interposed between adjacent color filter layers can be reduced, or such black matrix can be eliminated altogether as in the first embodiment shown in FIG. 3B. It should be noted that the FFS mode liquid crystal display panel of the first embodiment is provided with no black matrix, since a leakage electric field formed between the signal lines 17 and common electrodes 14 coincides with the rubbing direction, and thus this leakage electric field has little influence on liquid crystal molecules initially aligned near the signal lines 17. This arrangement makes it less likely that the initial alignment of liquid crystals is disturbed.

In the FFS mode liquid crystal display panel 10A of the first embodiment, each of the slits 20A provided in the pixel electrode 21 has an open end on one side, so that a fringe effect can be exerted thoroughly in a portion before the open end 20A' side of the slits 20A. Having a wider area serving as a display region in a single pixel than in a liquid crystal display panel having slits whose both ends are closed, the FFS mode liquid crystal display panel 10A provides bright displays.

In the FFS mode liquid crystal display panel 10A of the first embodiment, the slits 20A lying in pixels on odd-numbered lines and even-numbered lines may be inclined in opposite directions to each other. Having such arrangement lowering dependence on the viewing angle when viewed in a direction crossing the signal lines 17, this FFS mode liquid crystal display panel 10A yields even better display quality. While an FFS mode liquid crystal display panel in which an insulator is provided on common electrodes and pixel electrodes are provided on top of the insulator is used in the first embodiment, an FFS mode liquid crystal display panel in which an insulator is provided on pixel electrodes and common electrodes are provided on top of the insulator can be used instead.

Second Embodiment

Figure 4:
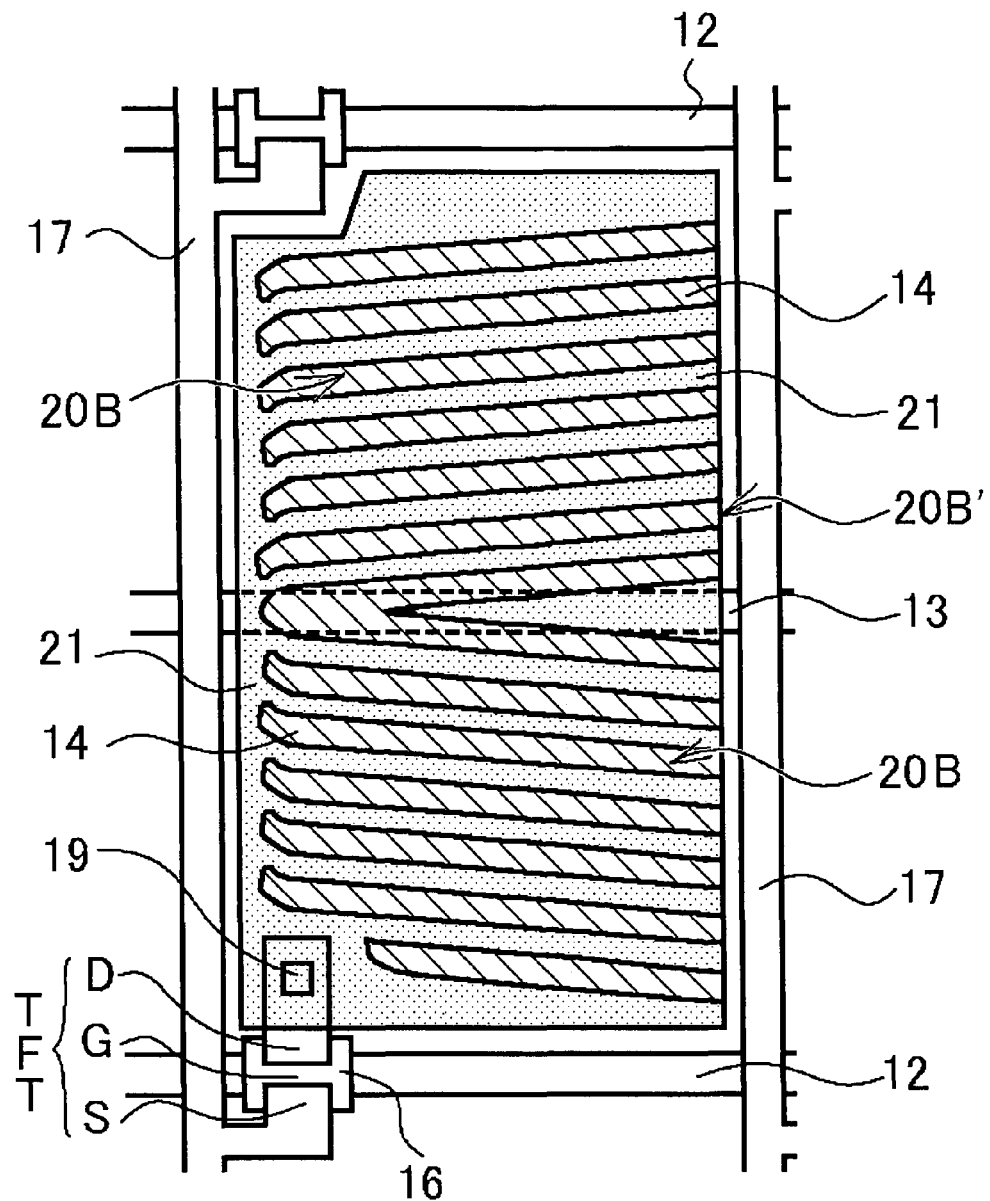
FIG. 4 is a schematic plan view of a single pixel portion of an FFS mode liquid crystal display panel of a second embodiment of the invention, seen through its color filter substrate and alignment layer.

An FFS mode liquid crystal display panel 10B according to a second embodiment of the invention will now be described with reference to FIG. 4. FIG. 4 is a schematic plan view of a single pixel portion of the FFS mode liquid crystal display panel of the second embodiment, seen through its color filter substrate and alignment layer. Component elements in FIG. 4 that have identical structure to those in the FFS mode liquid crystal display panel 10A of the first embodiment shown in FIGS. 1 and 2 are assigned the identical reference numerals and detailed descriptions thereof are omitted.

The FFS mode liquid crystal display panel 10B of the second embodiment is substantially the same as the FFS mode liquid crystal display panel 10A of the first embodiment shown in FIGS. 1 and 2, except that a plurality of slits 20B provided in each pixel electrode 21 are inclined in different directions so as to be symmetric to each other on both sides of each common wire 13 provided between adjacent scan lines 12. The slits 20B are inclined relative to the scan lines 12 at about 5° to 20° above the common wire 13 and at about −20° to −5° below the common wire 13. Although not shown, the centerline of the color filter layer is shifted toward an open end 20B' side of the slits 20B from the centerline 31 of each pixel electrode also in the FFS mode liquid crystal display panel 10B of the second embodiment. As a result, tolerances for misalignment to the right and left become substantially equal, making the occurrence of color mixture less likely.

Accordingly, like the FFS mode liquid crystal display panel 10A of the first embodiment, the FFS mode liquid crystal display panel 10B of the second embodiment not only reduces the occurrence of color mixture, but also has a wider area serving as a display region in a single pixel than in a liquid crystal display panel having slits whose both ends are closed. As a result, the FFS mode liquid crystal display panel 10B provides bright displays.

In the FFS mode liquid crystal display panel 10B of the second embodiment, the numbers of the slits 20B provided on each of both sides of the common wire 13 are equal. In other words, the pixel electrode 21 of every pixel included in the FFS mode liquid crystal display panel 10B of the second embodiment has vertical symmetry about the common wire 13, so that there is less dependence on the viewing angle affecting display quality when viewed in a direction crossing the common wire 13. It should be noted that while different numbers of the slits 20B can be provided on both sides of the common wire 13, there is no advantage in doing so. It is preferable that the numbers of the slits on both sides be equal for the sake of securing viewing angle symmetry.

In the FFS mode liquid crystal display panel 10B of the second embodiment, the common wire 13 is fabricated from the same material of Mo—Al two-layer wiring lines as the scan lines 12 and therefore blocks light. The ends of the slits on both sides of the common wire 13 that are closest thereto are joined above the common wire 13 in a manner that the slits are arranged in two mutually inclined sets, one above the other. Since the slits on both sides of the common wire 13 that are closest thereto are inclined in different directions to each other, liquid crystal molecules on both sides of the common wire 13 are aligned in different directions to each other. Although this arrangement results in disclination along the common wire 13, the common wire 13 blocks light at such disclination portions. It is therefore less likely that such disclination portions are visible to viewers, so that this liquid crystal display panel yields good display quality.

In the FFS mode liquid crystal display panel 10B of the second embodiment, the slits 20B lying in pixels on odd-numbered lines and even-numbered lines may be inclined in opposite directions to each other. This arrangement lowers dependence on the viewing angle when viewed in a direction crossing the signal lines 17, so that the FFS mode liquid crystal display panel 10B yields even better display quality.

Third Embodiment

Figure 5:
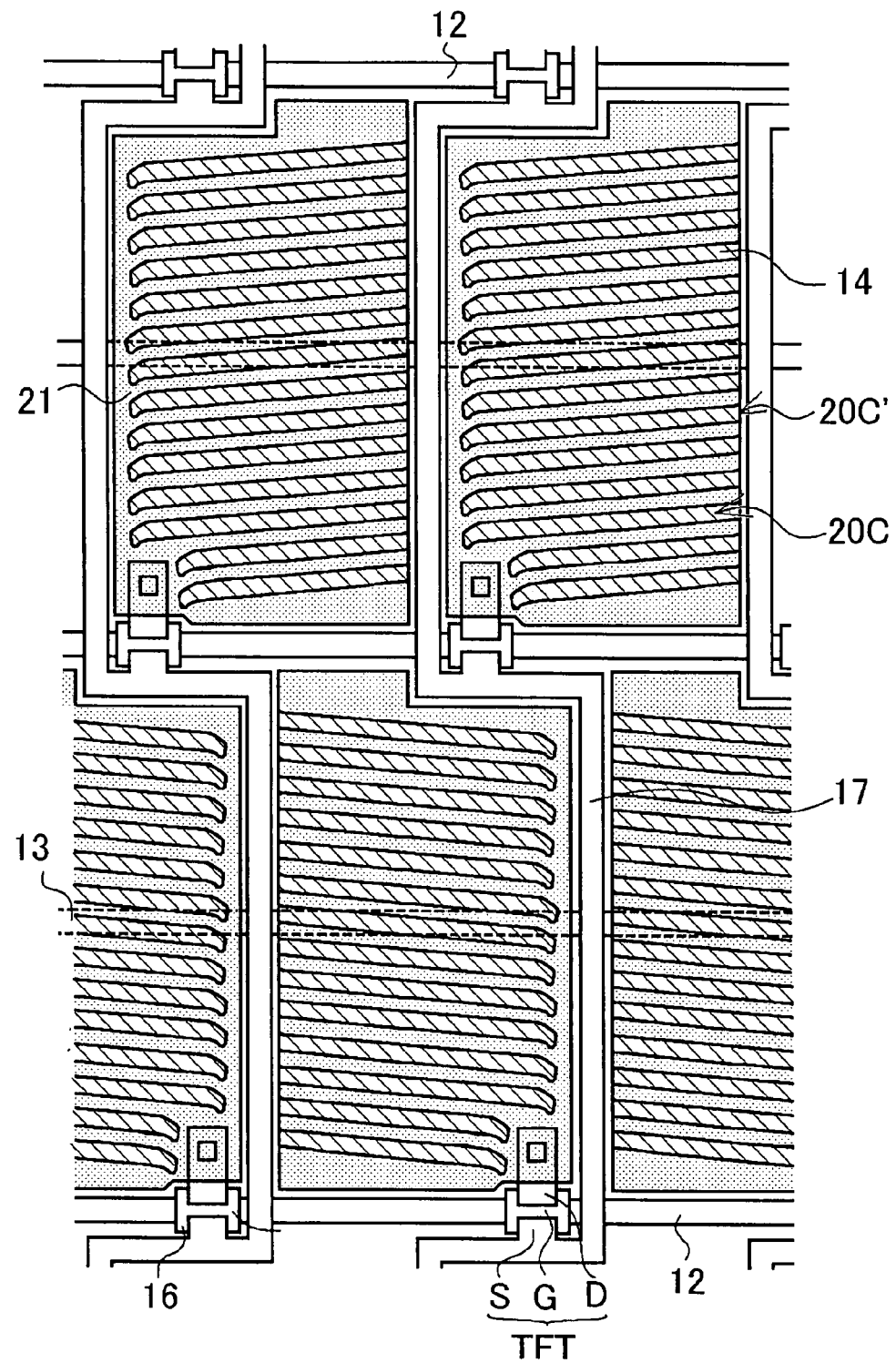
FIG. 5 is a schematic plan view of several pixel portions of an FFS mode liquid crystal display panel of a third embodiment of the invention, seen through its color filter substrate and alignment layer.

An FFS mode liquid crystal display panel 10C according to a third embodiment of the invention will now be described with reference to FIG. 5. FIG. 5 is a schematic plan view of several pixel portions of the FFS mode liquid crystal display panel of the third embodiment, seen through its color filter substrate and alignment layer. Component elements in FIG. 5 that have identical structure to those in the FFS mode liquid crystal display panel 10A of the first embodiment shown in FIGS. 1 and 2 are assigned the identical reference numerals and detailed descriptions thereof are omitted.

The FFS mode liquid crystal display panel 10C of the third embodiment is substantially the same as the FFS mode liquid crystal display panel 10A of the first embodiment shown in FIGS. 1 and 2, except that individual pixels are shifted line by line in a delta layout and a plurality of slits 20C lying in pixels on odd-numbered lines and even-numbered lines are inclined in opposite directions to each other. Although not shown, the centerline of the color filter layer is shifted toward an open end 20C' side of the slits 20C from the centerline 31 of each pixel electrode also in the FFS mode liquid crystal display panel 10C of the third embodiment. As a result, tolerances for misalignment to the right and left become substantially equal, making the occurrence of color mixture less likely.

Accordingly, like the FFS mode liquid crystal display panel 10A of the first embodiment, the FFS mode liquid crystal display panel 10C of the third embodiment not only reduces the occurrence of color mixture, but also has a wider area serving as a display region in a single pixel than in a liquid crystal display panel having slits whose both ends are closed. As a result, the FFS mode liquid crystal display panel 10C provides bright displays.

Since the slits 20C on odd-numbered lines and even-numbered lines are inclined in opposite directions to each other in the FFS mode liquid crystal display panel 10C of the third embodiment, there is less dependence on the viewing angle when viewed in a direction crossing the signal lines 17. As a result, the FFS mode liquid crystal display panel 10C yields good display quality.

In addition, since individual pixels are shifted line by line in a delta layout in the FFS mode liquid crystal display panel 10C of the third embodiment, the signal lines 17 are provided in a crank shape in a direction orthogonal to the scan lines 12, so that the signal lines 17 will not form straight lines. Accordingly, the signal line 17 portions are not very visible to viewers, and this FFS mode liquid crystal display panel 10C is well suited for image displays.

Fourth Embodiment

Figure 6:
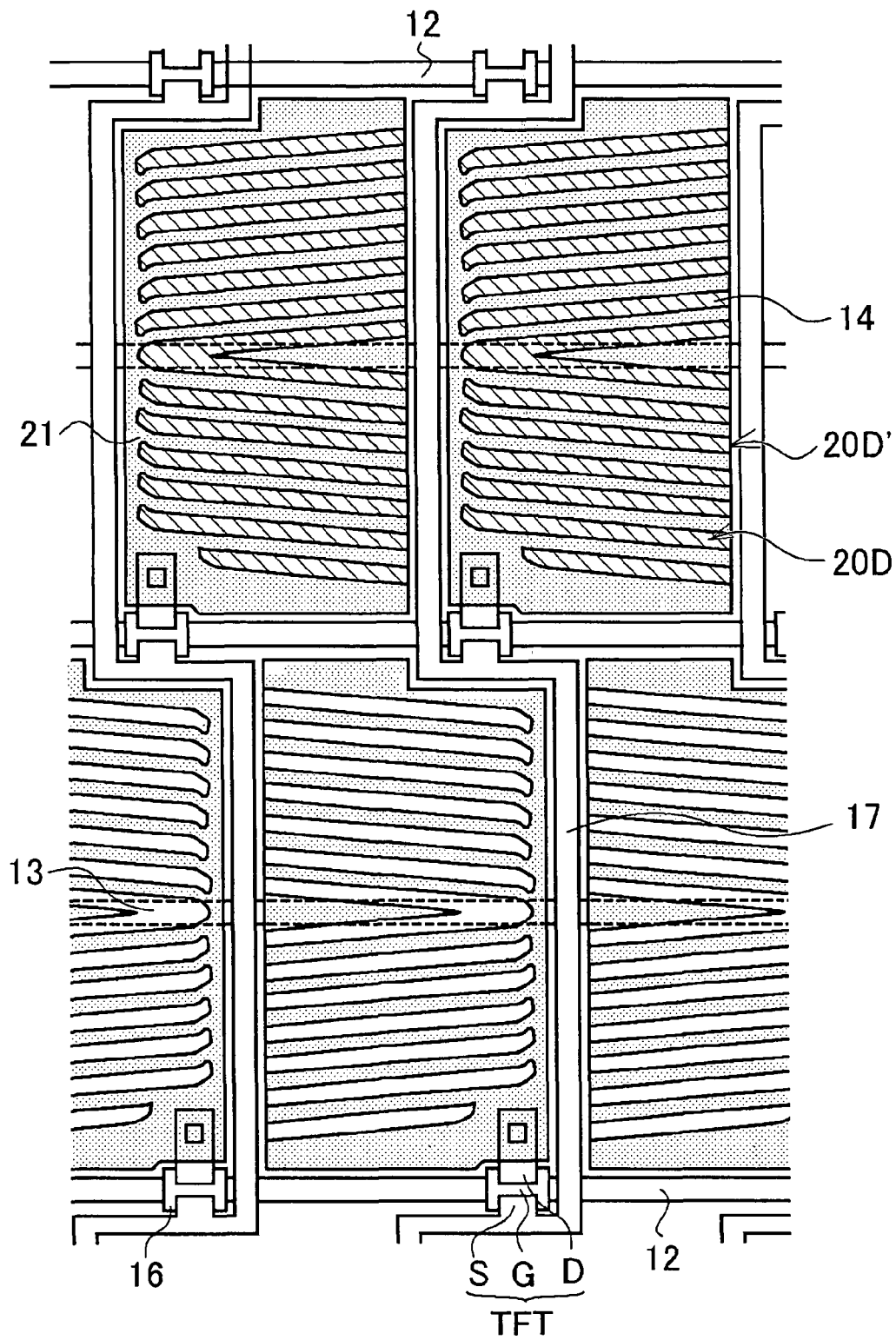
FIG. 6 is a schematic plan view of several pixel portions of an FFS mode liquid crystal display panel of a fourth embodiment of the invention, seen through its color filter substrate and alignment layer.

An FFS mode liquid crystal display panel 10D according to a fourth embodiment of the invention will now be described with reference to FIG. 6. FIG. 6 is a schematic plan view of several pixel portions of the FFS mode liquid crystal display panel of the fourth embodiment, seen through its color filter substrate and alignment layer. Component elements that have identical structure to those in the FFS mode liquid crystal display panel 10C of the third embodiment shown in FIG. 5 are assigned the identical reference numerals and detailed descriptions thereof are omitted.

The FFS mode liquid crystal display panel 10D of the fourth embodiment is substantially the same as the FFS mode liquid crystal display panel 10C of the third embodiment, except slits 20D provided in each pixel are arranged in two mutually inclined sets, one above the other, thus producing dual domains as in the FFS mode liquid crystal display panel 10B of the second embodiment. Although not shown, the centerline of the color filter layer is shifted toward an open end 20D' side of the slits 20D from the centerline 31 of each pixel electrode also in the FFS mode liquid crystal display panel 10D of the fourth embodiment. As a result, tolerances for misalignment to the right and left become substantially equal, making the occurrence of color mixture less likely.

While yielding the same advantages as the FFS mode liquid crystal display panel 10C of the third embodiment, the FFS mode liquid crystal display panel 10D of the fourth embodiment provides even better display quality since every pixel in the liquid crystal display panel has vertical symmetry about the common wire 13.

Fifth Embodiment

Figure 7:
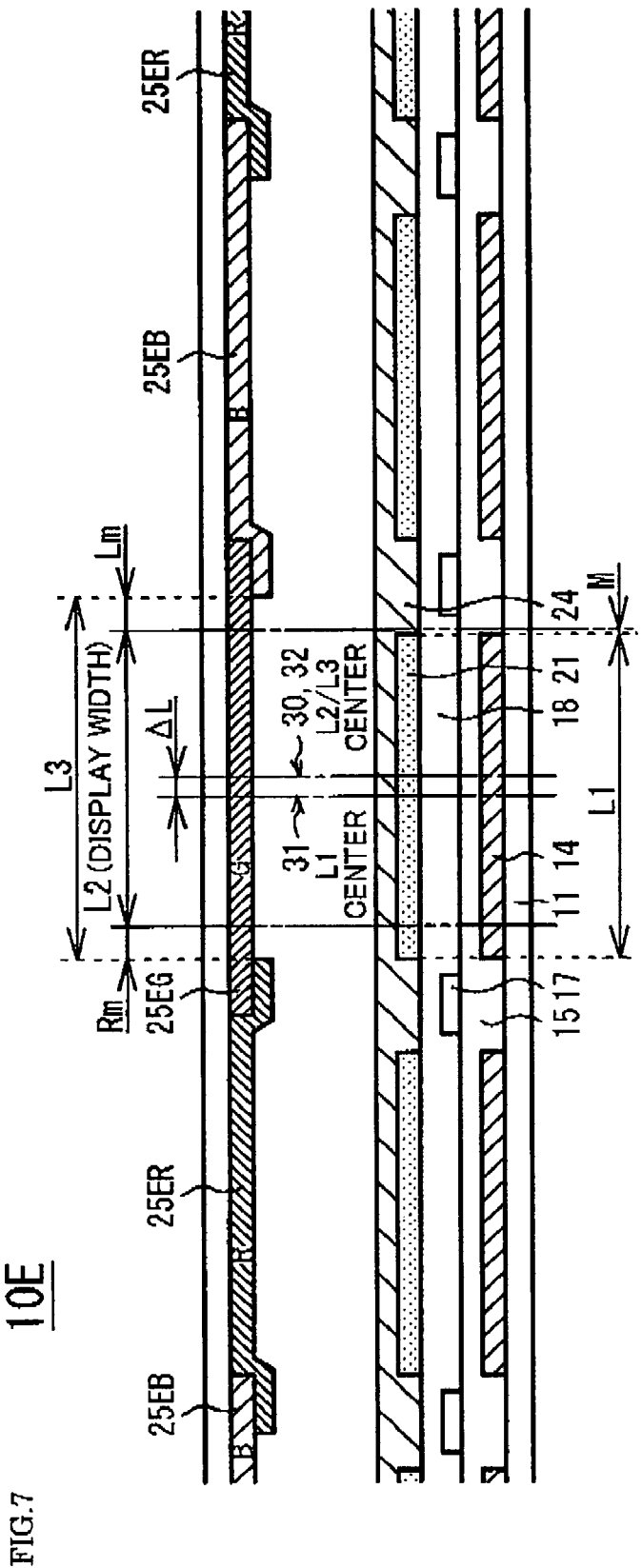
FIG. 7 is a cross-sectional view of an FFS mode liquid crystal display panel of a fifth embodiment of the invention along line IIIB-IIIB in FIG. 3A.
Figure 8:
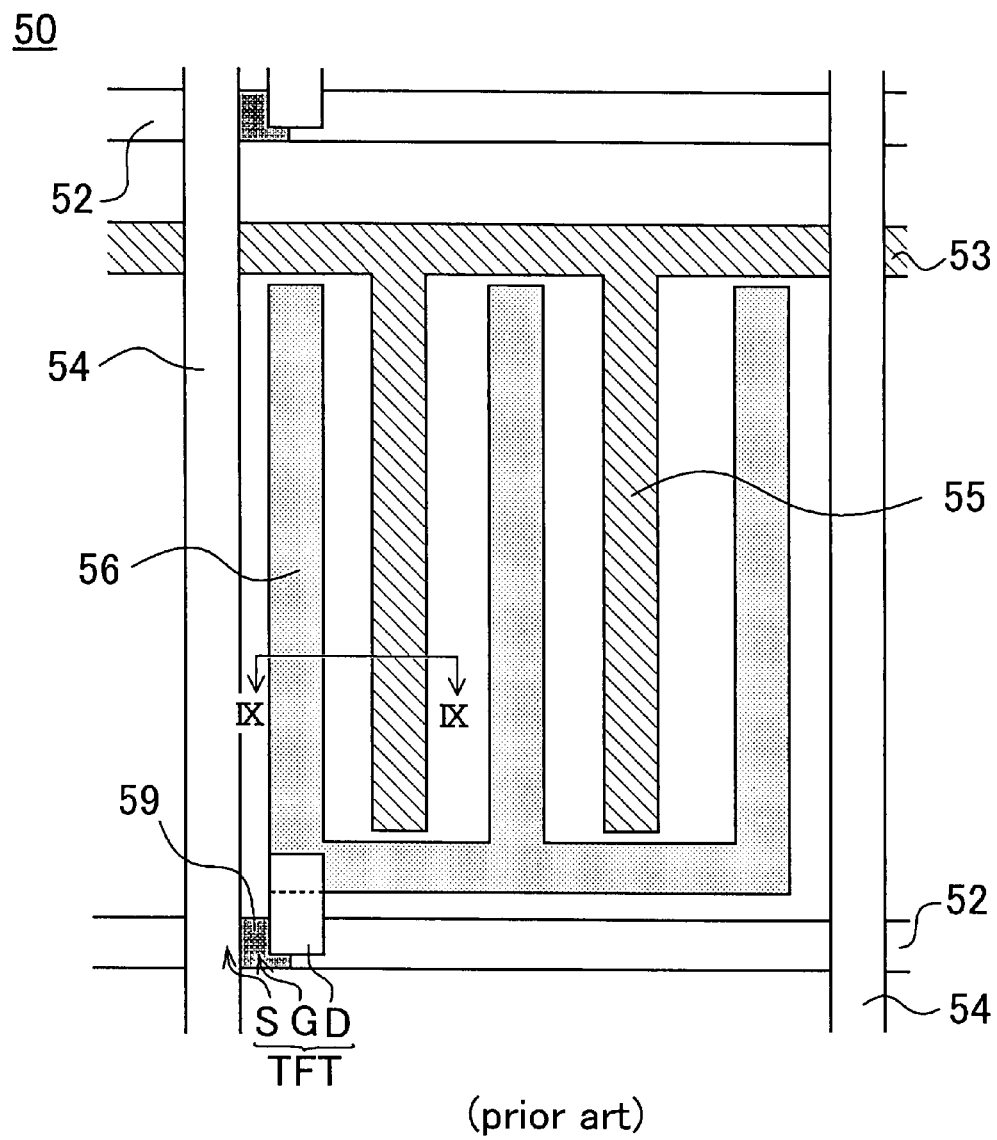
FIG. 8 is a schematic plan view of a single pixel portion of an IPS mode liquid crystal display panel.
Figure 9:
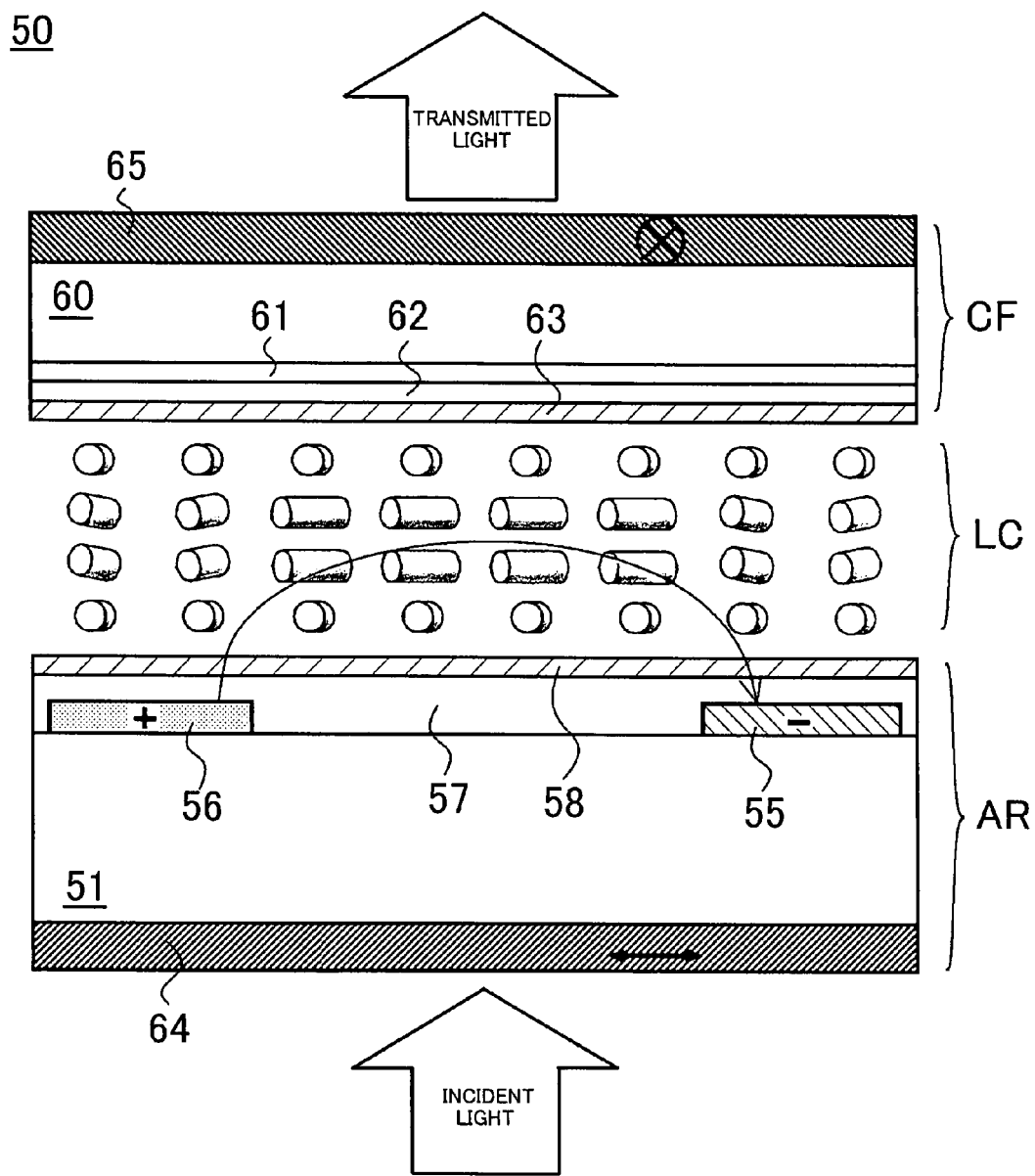
FIG. 9 is a cross-sectional view along line IX-IX in FIG. 8.
Figure 10:
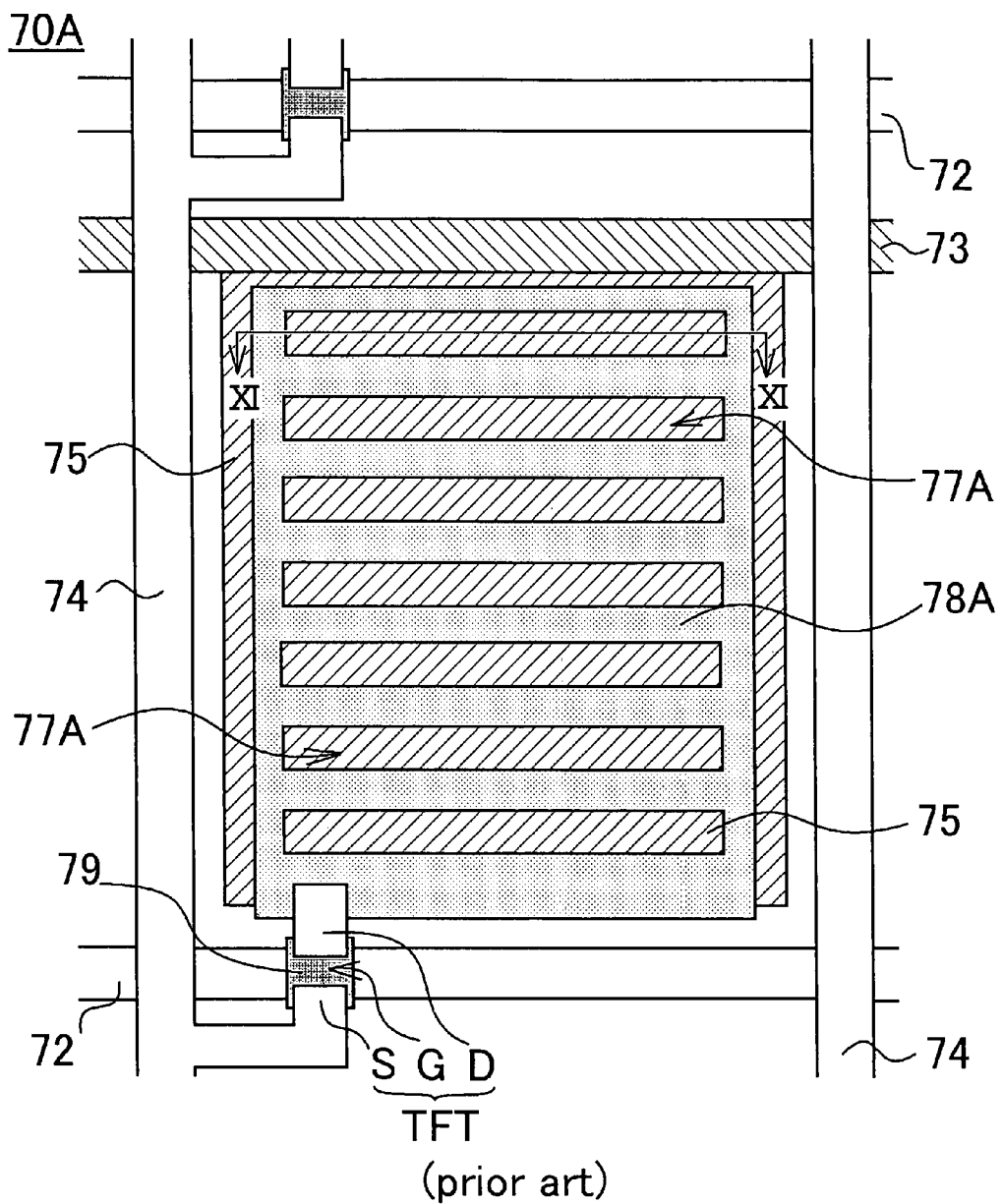
FIG. 10 is a schematic plan view of a single pixel portion of an FFS mode liquid crystal display panel.
Figure 11:
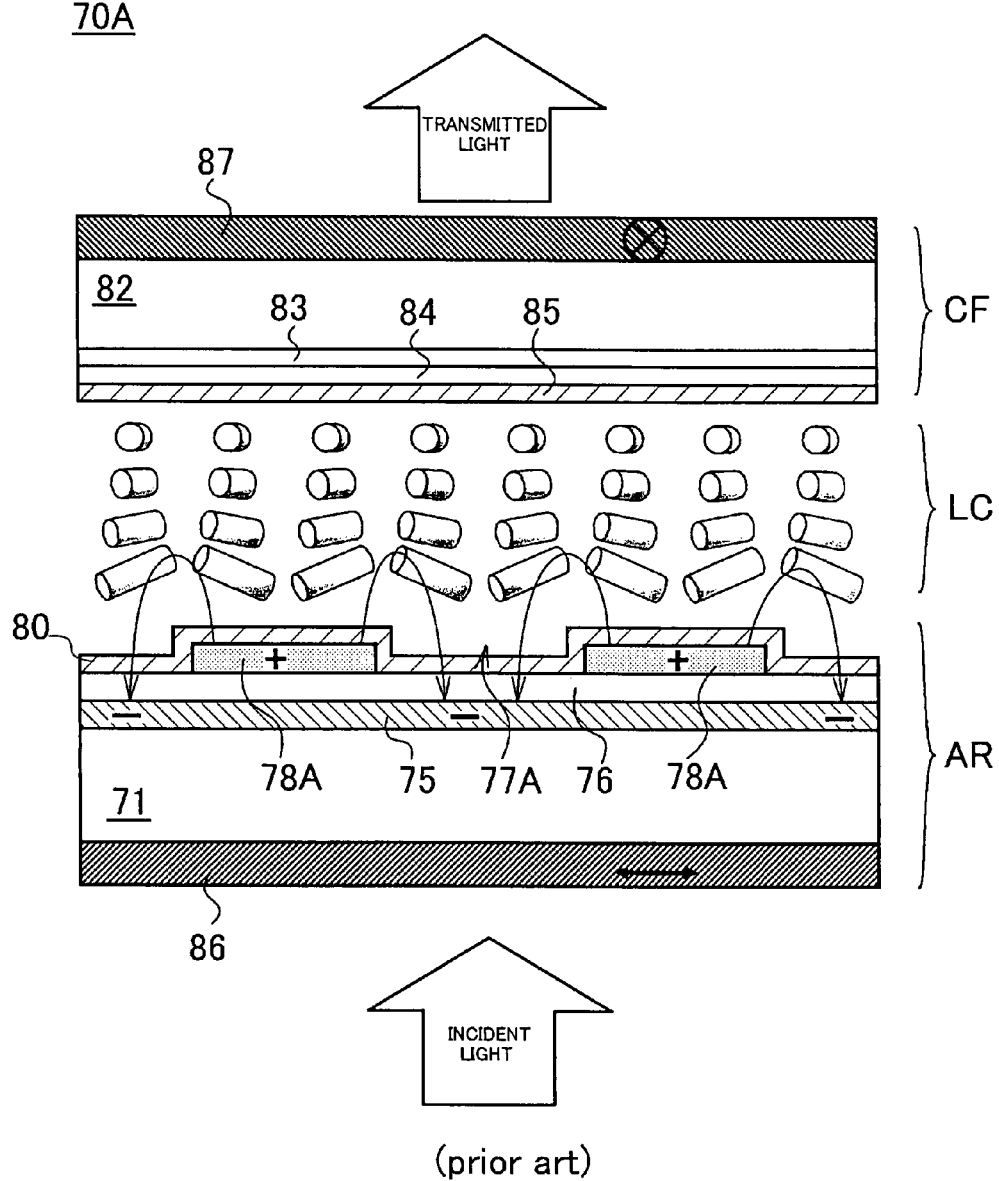
FIG. 11 is a cross-sectional view along line XI-XI in FIG. 10.
Figure 12:
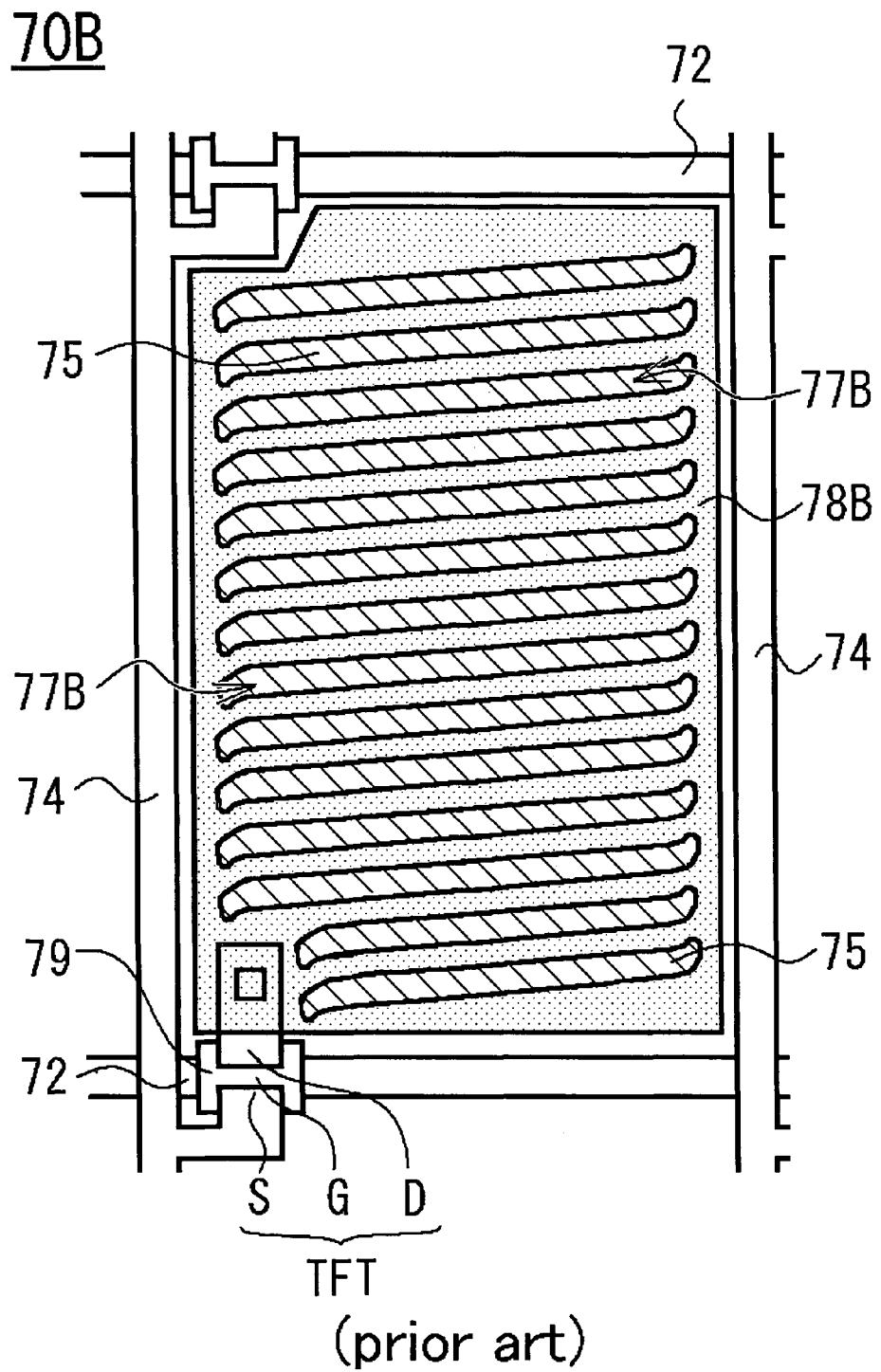
FIG. 12 is a schematic plan view of a related-art FFS mode liquid crystal display panel.
Figure 14:
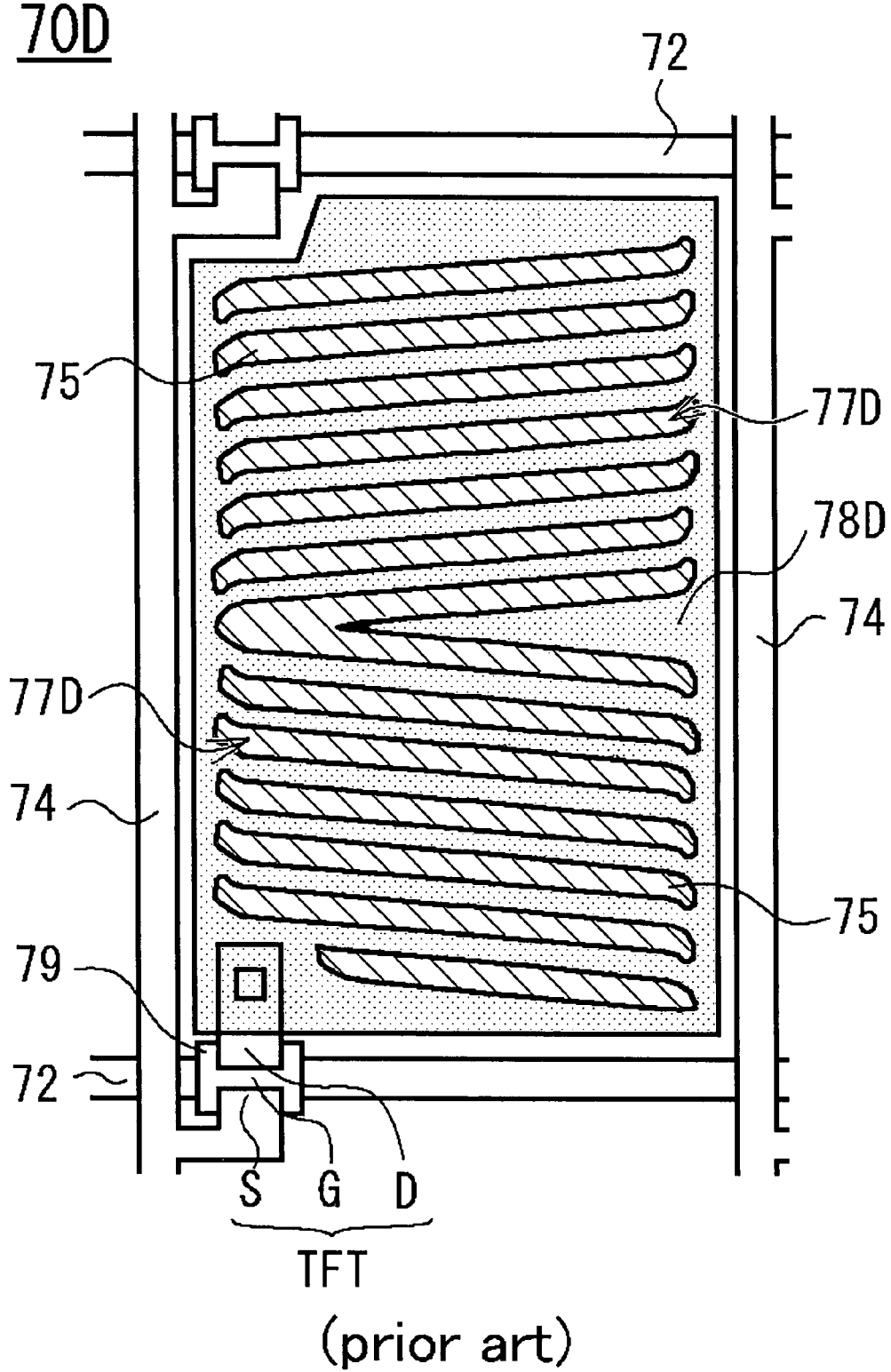
FIG. 14 is a schematic plan view of an FFS mode liquid crystal display panel having dual domains.
Figure 15:
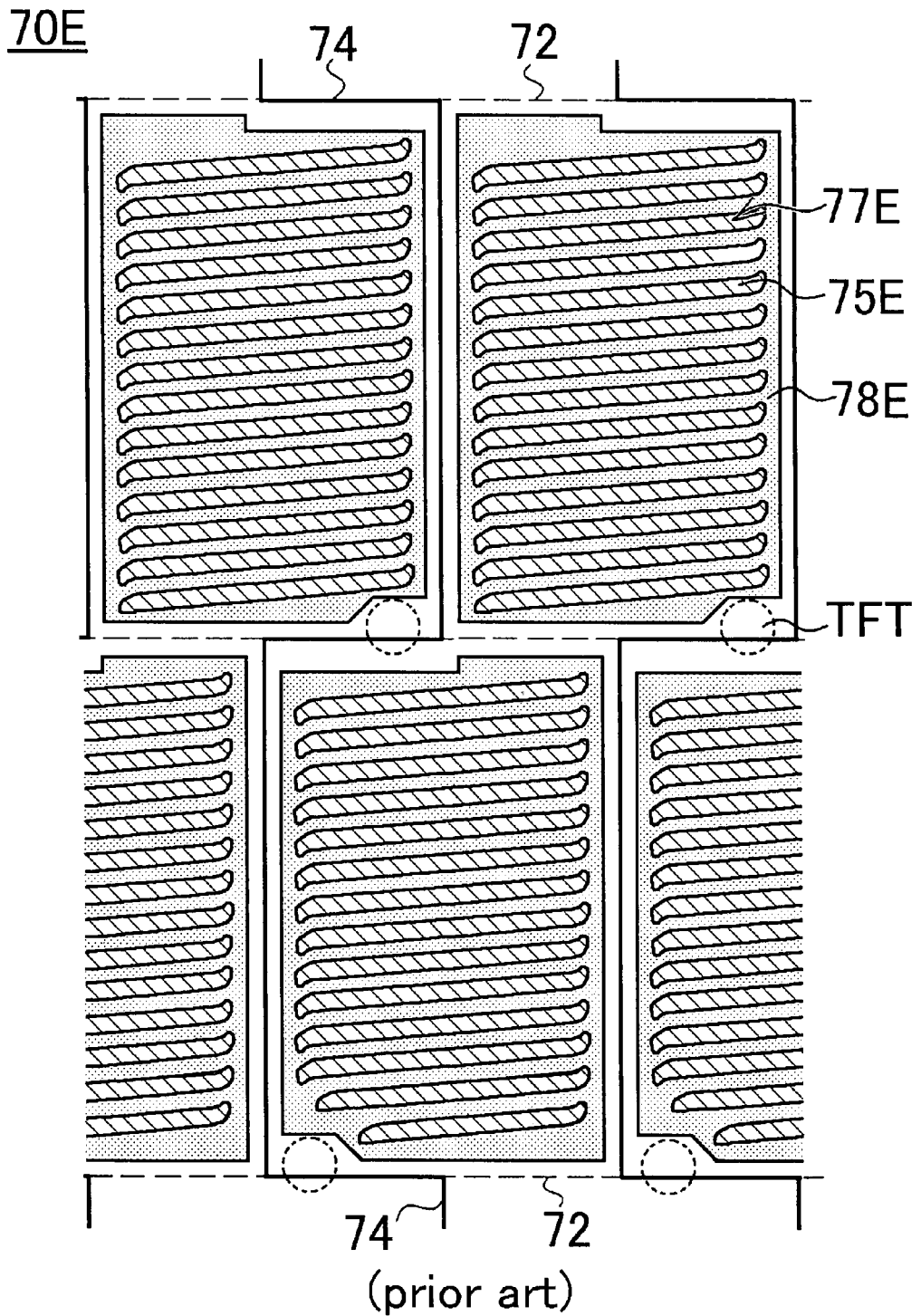
FIG. 15 is a schematic plan view of an FFS mode liquid crystal display panel having a delta layout.

An FFS mode liquid crystal display panel 10E according to a fifth embodiment of the invention will now be described with reference to FIG. 7. FIG. 7 is a cross-sectional view corresponding to FIG. 3B of the first embodiment shown in FIG. 1. The liquid crystal display panel 10E of the fifth embodiment is produced by modifying the color filter substrate included in the liquid crystal display panel 10A of the first embodiment. Therefore, the arrangements of the first embodiment shown in FIGS. 1, 2, and 3A also apply to the fifth embodiment. Component elements in FIG. 5 that have identical structure to those in the FFS mode liquid crystal display panel 10A of the first embodiment shown in FIGS. 1, 2, and 3A are assigned the identical reference numerals and detailed descriptions thereof are omitted.

Referring to FIG. 7, color filter layers 25ER, 25EG, 25EB in the fifth embodiment are deposited in the order of G, B, and R with their right and left edges overlapped each other. The overlap areas are non-display regions that serves as a black matrix. This arrangement of the fifth embodiment causes no light leakage even if adjacent color filter layers are misaligned, where uncolored light leaks in the first embodiment.

The centerline 30 of a width L3 with the overlap areas of the color filter layers 25ER, 25EG, 25EB excluded coincides with the centerline 31 of the display width L2. Accordingly, the centerline 30 of the color filter layers 25ER, 25EG, 25EB is shifted toward an open end 20D' side of the slits 20D from the centerline 31 of each pixel electrode, so that tolerances for misalignment to the right and left become substantially equal, making the occurrence of color mixture less likely.

The centerline 31 of the pixel electrode 21 is defined as the center in the width direction thereof, because the distances from the right and left edges of the pixel electrode 21 to their adjacent signal lines 17, as viewed from above, are substantially equal. When the distances from the right and left edges of the pixel electrode 21 to their adjacent signal lines 17 are different from each other, the centerline 31 may be defined as a median position from the center of one signal line 17 to the center of its adjacent signal line 17.

While the centerline 30 of each color filter layers coincides with the display centerline 32 as viewed from above in the above-described embodiments, applications are not limited to this. If only the centerline 30 of the color filter layer is shifted toward the open end 20A' side of the slits 20A, the advantage of making the occurrence of color mixture less likely can be achieved.

What is claimed is:

1. A liquid crystal display panel comprising:
    an array substrate, the array substrate including a plurality of scan lines provided in parallel with one another, a plurality of signal lines provided in a direction orthogonal to the scan lines, first electrodes each provided in a space delimited by the scan lines and the signal lines, second electrodes provided corresponding to the first electrodes with an insulator therebetween, and portions defining a plurality of slits provided to each of the second electrodes in parallel with one another in a direction crossing the signal lines from a first side of the second electrode to a second side of the second electrode;
    a color filter substrate including a color filter layer; and
    a liquid crystal layer held between the array substrate and the color filter substrate;
    the liquid crystal display panel driving the liquid crystal layer by an electric field formed between the first electrodes and the second electrodes,
    each of the slits has an open end on the first side and a closed end on the second side, and is inclined at an angle relative to the scan lines of about 5 to 20 degrees, and
    the color filter layer having a centerline extending along the signal lines for individual pixels, the centerline being shifted toward the open end side of each slit from a centerline of each second electrode as viewed from above.

2. The liquid crystal display panel according to claim 1, wherein the centerline.

3. The liquid crystal display panel according to claim 2, wherein the slits lying in pixels on odd-numbered lines and even-numbered lines are inclined in opposite directions to each other.

4. The liquid crystal display panel according to claim 1, wherein the slits are provides so as to be inclined relative to the scan lines.

5. The liquid crystal display panel according to claim 4, further comprising:
   a common wire provided between the scan lines in parallel with the scan lines, the slits being provided so as to be inclined in different directions to each other on both sides of the common wire.

6. The liquid crystal display panel according to claim 5, wherein the numbers of the slits provided on each of both sides of the common wire are equal.

7. The liquid crystal display panel according to claim 5, wherein the ends of the slits on both sides of the common wire that are closest thereto are joined above the common wire.

8. The liquid crystal display panel according to claim 1, wherein the signal lines are provided in a crank shape in a direction orthogonal to the scan lines, and the first electrodes and the second electrodes are arranged in a delta layout.

9. The liquid crystal display panel according to claim 1, wherein ends of adjacent color filter layers overlap in a direction in which the scan lines extend, and the color filter centers on a centerline of an area of the color filter layer with any overlap area excluded.

10. A liquid crystal display panel comprising:
   an array substrate, the array substrate including a plurality of scan lines provided in parallel with one another, a plurality of signal lines provided in a direction orthogonal to the scan lines, first electrodes each provided in a space delimited by the scan lines and the signal lines, second electrodes provided corresponding to the first electrodes with an insulator therebetween, and portions defining a plurality of slits provided to each of the second electrodes in parallel with one another in a direction crossing the signal lines from a first side of the second electrode to a second side of the second electrode;
   a color filter substrate including a color filter layer; and
   a liquid crystal layer held between the array substrate and the color filter substrate;
   the liquid crystal display panel driving the liquid crystal layer by an electric field formed between the first electrodes and the second electrodes,
   each of the slits has an open end on the first side and a closed end on the second side, and is inclined at an angle relative to the scan lines of about 5 to 20 degrees, and
   the color filter layer having a centerline extending along the signal lines for individual pixels, the centerline being shifted toward the open end side of each slit from a centerline located in a median position between centers of adjacent signal lines as viewed from above.

11. The liquid crystal display panel according to claim 10, wherein the centerline of the color filter layer coincides with a display centerline that is shifted toward the open end side of each slit.

12. The liquid crystal display panel according to claim 11, wherein the slits lying in pixels on odd-numbered lines and even-numbered lines are included in opposite directions to each other.

13. The liquid crystal display panel according to claim 10, wherein the slits are provided so as to be inclined relative to the scan lines.

14. The liquid crystal display panel according to claim 13, further comprising:
   a common wire provided between the scan lines in parallel with the scan lines, the slits being provided on each of both sides of the common wire are equal.

15. The liquid crystal display panel according to claim 14, wherein the numbers of the slits provided on each of both sides of the common wire are equal.

16. The liquid crystal display panel according to claim 14, wherein the slits on both sides of the common wire that are closest thereto are joined above the common wire.

17. The liquid crystal display panel according to claim 10, wherein the signal lines are provided in a crank shape in a direction orthogonal to the scan lines, and the first electrodes and the second electrodes are arranged in a delta layout.

18. The liquid crystal display panel according to claim 10, wherein ends of adjacent color filter layers overlap in a direction in which the scan lines extend, and the color filter centers on a centerline of an area of the color filter layer with any overlap area excluded.

* * * * *